(12) United States Patent
Hannaford

(10) Patent No.: US 9,001,252 B2
(45) Date of Patent: Apr. 7, 2015

(54) IMAGE MATCHING TO AUGMENT REALITY

(75) Inventor: Blake Hannaford, Seattle, WA (US)

(73) Assignee: Empire Technology Development LLC, Wilmington, DE (US)

(*) Notice: Subject to any disclaimer, the term of this patent is extended or adjusted under 35 U.S.C. 154(b) by 782 days.

(21) Appl. No.: 12/611,083

(22) Filed: Nov. 2, 2009

(65) Prior Publication Data

US 2011/0102605 A1 May 5, 2011

(51) Int. Cl.
| | |
|---|---|
| *H04N 5/222* | (2006.01) |
| *G06F 17/30* | (2006.01) |
| *G06K 9/00* | (2006.01) |
| *G06T 19/00* | (2011.01) |
| *H04W 4/02* | (2009.01) |
| *H04L 29/08* | (2006.01) |

(52) U.S. Cl.
CPC ........ *G06F 17/3087* (2013.01); *G06K 9/00671* (2013.01); *G06T 19/006* (2013.01); *H04W 4/02* (2013.01); *H04L 67/2804* (2013.01); *H04L 67/18* (2013.01); *H04L 67/289* (2013.01)

(58) Field of Classification Search
CPC .............. H04N 5/232; H04N 5/23248; H04N 5/23293; H04N 2101/00
USPC ................ 348/113, 115, 116, 119, 161, 169, 348/207.1, 208.2, 222.1, 231.3, 231.5, 348/333.01, 333.03, 333.12, 208.14, 348/333.02, 231.4
See application file for complete search history.

(56) References Cited

U.S. PATENT DOCUMENTS

| | | | |
|---|---|---|---|
| 5,146,228 A | 9/1992 | Irani et al. | |
| 5,815,411 A * | 9/1998 | Ellenby et al. | 702/150 |
| 6,037,936 A * | 3/2000 | Ellenby et al. | 715/764 |
| 6,307,556 B1 * | 10/2001 | Ellenby et al. | 345/427 |
| 6,697,761 B2 * | 2/2004 | Akatsuka et al. | 702/151 |
| 7,088,389 B2 * | 8/2006 | Shibasaki et al. | 348/239 |
| 7,728,869 B2 * | 6/2010 | Jung | 348/113 |
| 8,467,991 B2 * | 6/2013 | Khosravy et al. | 702/153 |
| 2008/0268876 A1 * | 10/2008 | Gelfand et al. | 455/457 |
| 2010/0191459 A1 * | 7/2010 | Carter et al. | 701/208 |

OTHER PUBLICATIONS

Cummins et al., "Probabilistic Appearance Based on Navigation and Loop Closing," Oxford University Mobile Robotics Research Group, 2007, 7 pages.

Förstner, W., "A Feature Based Correspondence Algorithm for Image Matching," International Archives of Photogrammetry, vol. 26(3), 1986, 17 pages.

(Continued)

*Primary Examiner* — Lin Ye
*Assistant Examiner* — Chriss Yoder, III
(74) *Attorney, Agent, or Firm* — Brundidge & Stanger, P.C.

(57) ABSTRACT

Technology for augmenting reality using image matching is described. The technology can receive a captured image, determine location information relating to the received image, and transmit the location information to a server computing device. The technology may then receive one or more tags from the server computing device, wherein each tag can include one or more patches and supplementary information corresponding to at least one of the patches and each patch can be associated with the location information. The technology can then determine using an image matching process whether at least one of the received one or more patches appears in the received image, and if a patch appears in the received image, render the supplementary information corresponding to the patch.

21 Claims, 10 Drawing Sheets

(56) References Cited

OTHER PUBLICATIONS

Gruen, A.W., "Adaptive Least Squares Correlation: A Powerful Image Matching Technique," South African Journal of Photogrammetry, Remote Sensing and Cartpgraphy, vol. 14(3), 1986, 13 pages.

Meng et al., "A Novel Filtering and Fusion Algorithm for Sequence Image Matching Navigation," IEEE Computer Society, Congress on Image and Signal Processing, 2008, 4 pages.

Van de Elsen et al., "Medical Imaging Matching—A Review with Classification," IEEE Engineering in Medicine and Biology, Mar. 1993, 14 pages.

Daniilidis, K., "computer vision and robotics," accessed at http://web.archive.org/web/20090720142521/http://www.seas.upenn.edu/~kostas/, accessed on Sep. 4, 2014, pp. 1-3.

Jing-Zheng, L., and Xu-Chu, Y., "Research on sar image matching technology based on sift," Zhengzhou Institute of Surveying and Mapping, Zhengzhou, China, pp. 403-408 (2008).

Tao, C.V., "Mobile Mapping Technology for Road Network Data Acquisition," Journal of Geospatial Engineering, vol. 2, No. 2, pp. 1-13 (1998).

\* cited by examiner

| # 402 | Location 404 | Template 406 | Supplementary Info 408 | Additional Info 410 |
|---|---|---|---|---|
| 1 | abcde | image 1 | For sale bubble | (12, -8) |
| 2 | fghij | image 2 | Neon sign, audio | (15, 5) |
| 3 | klmno | image 3 | Color: red, type: text | (-5, -7) |
| ... | ... | ... | ... | ... |

420 → row 1
422 → row 2
424 → row 3

*FIG. 4*

IMAGE MATCHING TO AUGMENT REALITY

BACKGROUND

The number of mobile computing devices in use has increased dramatically over the last decade and continues to increase. Examples of mobile computing devices are mobile telephones, digital cameras, and global positioning system ("GPS") receivers. According to one study, 60% of the world's population has access to mobile telephones. An increasing number of people use digital cameras and some manufacturers of digital cameras presently have revenues of tens of billions of United States dollars annually. GPS receivers can be employed to identify location; measure speed, or acceleration; and for other purposes. In many cases, all three technologies are featured together in some products. As examples, there are now highly portable digital cameras embedded in mobile telephones and other handheld computing devices. Some mobile phones also have GPS receivers to enable users to find their location, directions to a destination, etc. Some digital cameras have GPS receivers to record where a photo was taken.

Digital cameras are used to capture, store, and share images. Often, the images can be viewed nearly immediately after they are captured, such as on a display device associated with the digital cameras. Once an image is captured, it can be processed by computing devices. Image recognition is one such process that can be used to recognize and identify objects in an image. For example, image recognition techniques can determine whether an image contains a human face, a particular shape, etc. Some digital cameras employ image recognition techniques to identify human faces in an image to determine focus and exposure settings. As an example, when a camera detects that the image contains a face, it may attempt to focus the camera's lens on the face and, depending on the available light, determine whether to employ a flash, and what shutter speed and lens aperture to use to capture a pleasing image. When the camera detects that the image contains two or more faces, it may attempt to select a focus point and aperture combination such that there is sufficient depth of field to capture a sharp image of all of the detected faces. Image recognition can become increasingly complex as the set of recognizable objects increases. For example, when the computing device (e.g., camera) must also identify buildings, structures, or any object or location in the world, the camera may have insufficient resources (e.g., memory and computing power) to do so.

BRIEF DESCRIPTION OF THE DRAWINGS

FIG. 4 is a table diagram illustrating a table for storing various template-related information in various embodiments.

DETAILED DESCRIPTION

Figure 1:
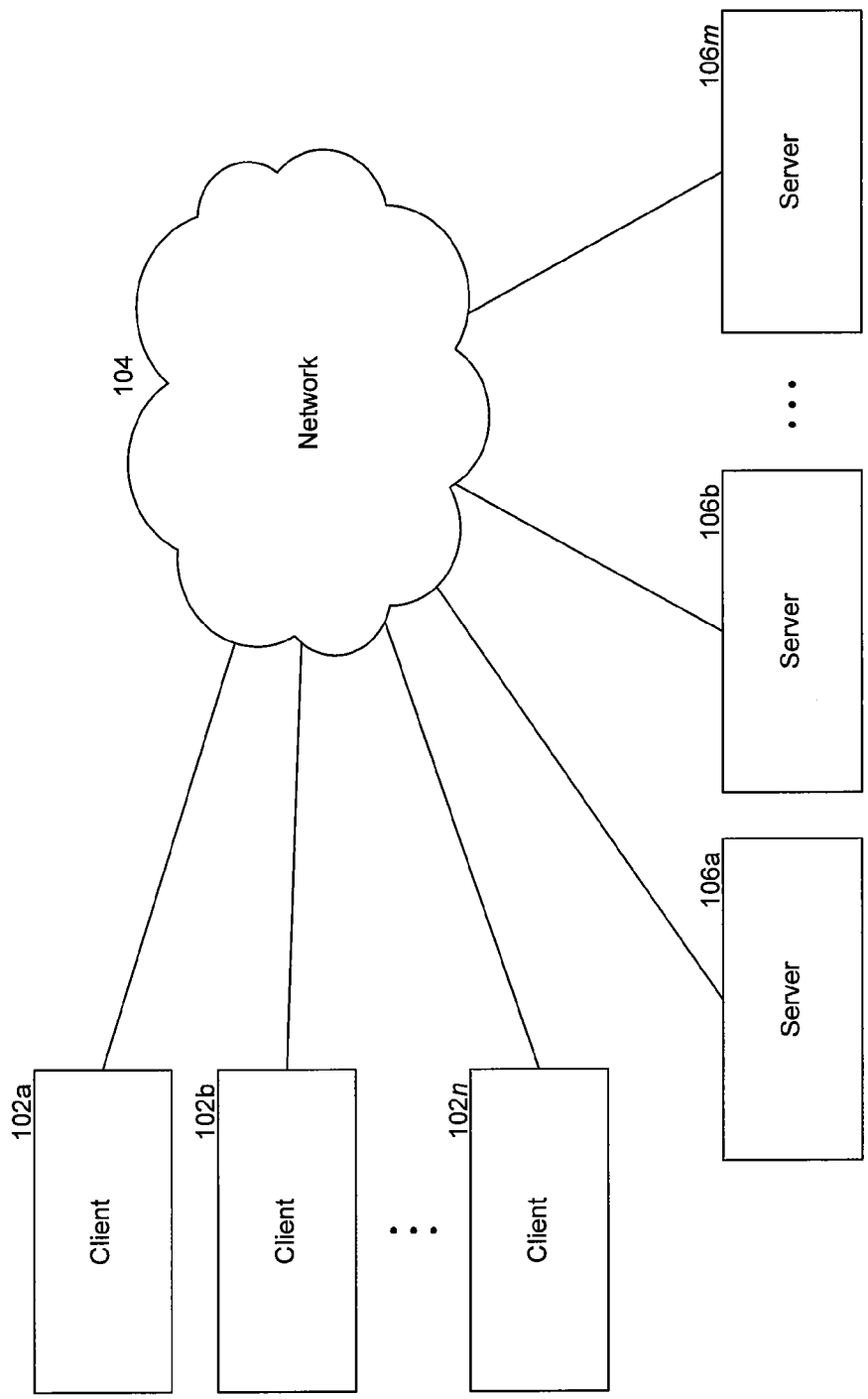
FIG. 1 is a block diagram illustrating an environment in which the image matching technology operates in some embodiments.

Image matching technology is described for augmenting reality depicted in a captured image by matching a portion of a captured image and overlaying additional information onto the captured image. In various embodiments, a user can employ a portable device (e.g., a standalone digital camera or some other portable electronic device that has a digital camera) to capture an image. Software executing on the portable device ("client software") can collect additional information (e.g., position information from a GPS receiver, accelerometer, digital compass, etc.) and then identify one or more portions of the captured image. In various embodiments, the client software can identify the one or more portions by transmitting the additional information the client software has collected to a server and receiving a set of templates and supplementary information from the server. The templates can be "patches" or portions of structures. By using image matching (or "template matching") techniques, the client software can determine which of the set of received templates appears in the captured image. Various image matching techniques known in the art can be employed. If any template appears in the captured image, the client software can overlay or superimpose supplementary information on the image during display on a display device. As an example, the template can be a portion of a building (e.g., a window or door) and the supplementary information can be an advertisement. By overlaying or superimposing the supplementary information, the technology augments reality depicted in the captured image.

In various embodiments, the image matching (also known as "template matching") can be performed either by the client software executing in connection with the portable device or by software executing at the server. Image matching can involve determining whether a first image (e.g., a template) appears within a second image (e.g., a captured image). Various techniques for image matching are known in the art. As an example, the first image can undergo various transformations (e.g., zooming and/or rotation) and the transformed first image can be compared to features of the second image to determine whether there is a match. This process can repeat for each template.

The technology can correlate templates with locations in one or more geospatial databases, e.g., in GOOGLE® Maps and/or MICROSOFT® BING™ Maps. Some geospatial databases include imagery at and/or around a given position. As an example, Google Maps includes a "Street View" mode in which, for any given geospatial position, multiple street-level images are available. In various embodiments, the technology may employ a database of templates wherein each template is associated with a geospatial location (e.g., latitude, longitude, altitude, distance from an object, other relationships in space in relation to other objects, etc.). The template can also be associated with supplementary information in the database or in other databases. The supplementary information can be images, text, advertisements, or any audiovisual content. As an example, when the digital camera captures an image and the software collects position information, the position information can be used to identify nearby templates and supplementary information.

The server can collect the templates and supplementary information near the indicated position and provide the collected templates and supplementary information to the client software. By doing so, the server can limit the amount of templates that need to be matched with the captured image. In various embodiments, the client software queries a geospatial database based on the location information that it collects and receives a set of templates (e.g., images) at or near the location. The client software can then employ image matching techniques to determine which of the templates it receives from the server is identifiable in the received set of images, if any. In various embodiments, the image matching techniques may identify a confidence level for each match and the client software may discard matches falling below a specified threshold confidence level. For each template, the server may provide supplementary information and additional information indicating where, in relation to the location of the template in the captured image, the supplementary information is to be overlaid. Once templates are matched in the captured image, the client software may overlay (e.g., superimpose) supplementary information on or near the templates, as indicated by the additional information.

In various embodiments, two or more conflicting templates may be matched to the captured image. As an example, two competing advertisers may both desire to place advertisements in templates at or near a famous landmark. In such a case, the technology may enable the advertisers to bid on placing their advertisement and the successful bidder's supplementary information may be displayed on or near the template.

In some embodiments, various users may add templates to the server. As examples, advertisers may provide templates relating to their storefronts or famous landmarks, users may provide templates relating to their home or favorite recreational activities, etc. In some embodiments, these templates may be available to all viewers or a selected subset of viewers. As an example, an advertiser may only desire the templates to be available to a demographic subset that may be receptive to the advertisement; or users may only desire to provide supplementary information to their acquaintances. Thus, the various users can specify criteria for making the supplementary information available.

In various embodiments, the patch (e.g., template) may be much larger than a region with which the patch is to be associated. As an example, an advertiser who is interested in associating a store that is visible from afar or miles away (e.g., from atop a skyscraper or mountaintop) may provide a patch that matches a large geographical area, but indicate that the supplementary information is associated with the store that appears as a very small portion of the patch.

The technology will now be described with reference to the Figures ("drawings"). In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is a block diagram illustrating an environment in which the image matching technology operates in some embodiments. The environment can include one or more computing devices, such as client computing devices 100A, 102B, and 100N. The client computing devices can be connected via a network 104 to one or more server computing devices, such as server computing devices 106A, 106B, and 106M. The network can be an intranet, the Internet, or any other type of wired or wireless data communications network. The client computing devices may be referred to herein as user computing devices, and include mobile computing devices, such as mobile telephones, digital cameras, etc.

Figure 2A:
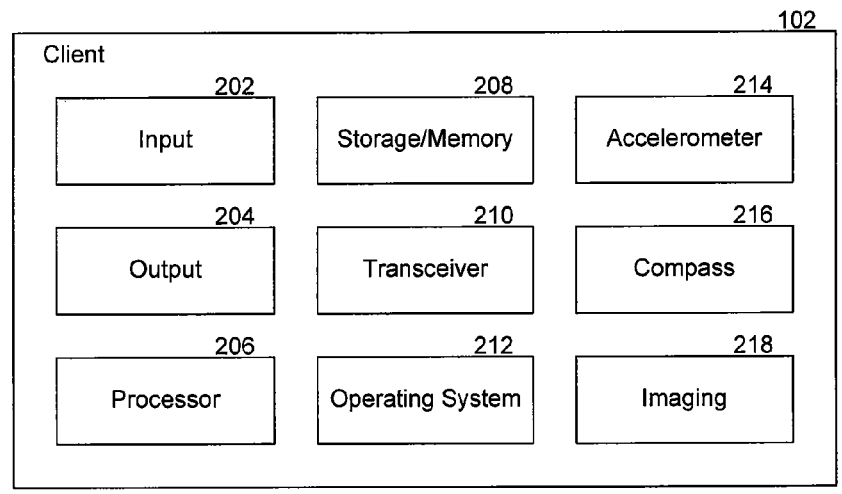
FIG. 2A is a block diagram illustrating components of a client (or user) computing device in various embodiments.

FIG. 2A is a block diagram illustrating components of a client (or user) computing device in various embodiments. A client computing device 102 can include various components, such as an input component 202, an output component 204, a processor 206, a storage or memory 208, a transceiver 210, an operating system 212, an accelerometer 214, a compass 216, an imaging component 218, and other components. The various components may be implemented as software and/or as hardware. The input component 202 can receive input using a digital camera, a keyboard, stylus, a GPS receiver, the accelerometer 214, the compass 216, etc. The output component 204 can provide output to a user using a display, a speaker or earpiece, or other output device. The processor 206 can be a general purpose or a special purpose processor for use with the client computing device. The storage or memory 208 may be implemented as volatile memory, persistent memory, some other memory device, or a combination of these and other types of memory devices. The transceiver 210 can be capable of sending and receiving digital communications, such as via cellular telephone networks, or other wired or wireless communications networks. The transceiver 210 may also receive GPS signals that can be correlated to determine the precise position of the client computing device. In various embodiments, the transceiver may be separate from the GPS receiver. The operating system 212 can be a general operating system or a special operating system designed for use with the client computing device. The accelerometer 214 can sense orientation, vibration, shock, or motion in one or more axes, and can provide input to the client computing device indicating, e.g., the direction of gravity. The compass 216 can provide input to the client computing device indicating a direction of magnetic north. By comparing the position of the client computing device calculated from GPS signals to magnetic north indicated by the compass 216, the client computing device may be capable of detecting proximity to metallic devices. As an example, the client computing device may compare expected magnetic variation at its present position to the indicated magnetic north to determine that it is proximate to metallic device if the comparison exceeds a threshold value. The client computing device may also include one or more imaging component 218 that implement various aspects of the image matching technology, such as to determine if templates are present in an image captured by a digital camera associated with the client computing device.

Figure 2B:
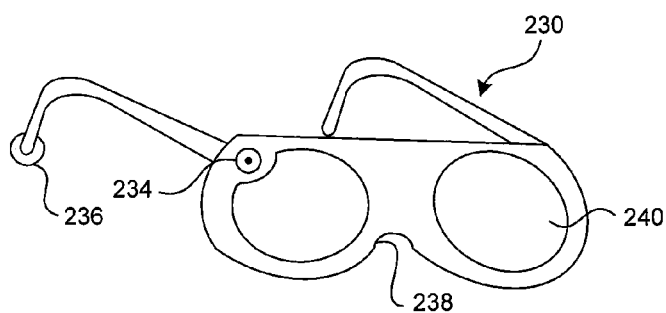
FIGS. 2B-2C are illustrations of client computing devices in various embodiments.
Figure 2C:
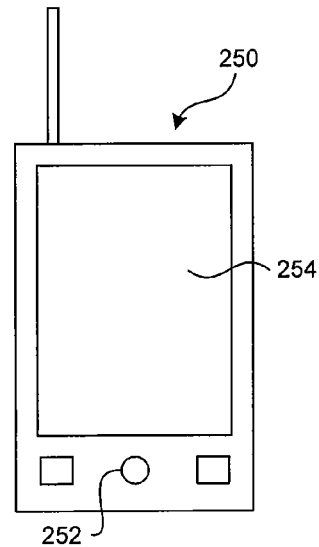

FIGS. 2B-2C are illustrations of client computing devices in various embodiments. FIG. 2B illustrates an example of a client computing device that is implemented as spectacles 230. The spectacles 230 can include a camera 234, an earpiece or speaker 236, a housing 238, and a display 240. The housing 238 can contain electronics, such as a processor, memory, and other circuitry or components associated with the client computing device 102. The display 240 can be capable of superimposing digital images (e.g., supplementary information) on a scene that the user perceives through lenses of the spectacles 230. In alternative embodiments, the lenses may display an image received via the camera 234 and superimpose a digital image (e.g., supplementary information) on the digital image. In various embodiments, the spectacles may be replaced by alternative devices (e.g., contact lenses or other artificial lenses) that are associated with electronics and display components. As an example, such an alternative device may be placed on or near a user's cornea and may be capable of capturing images and/or superimposing digital images on whatever the user's eye (whether natural or artificial) perceives.

FIG. 2C illustrates an example of a client computing device that is implemented as a mobile telephone 250. The mobile telephone 250 may include a camera 252 and a display 254. The mobile telephone can also include other components commonly associated with mobile telephones.

Figure 3:
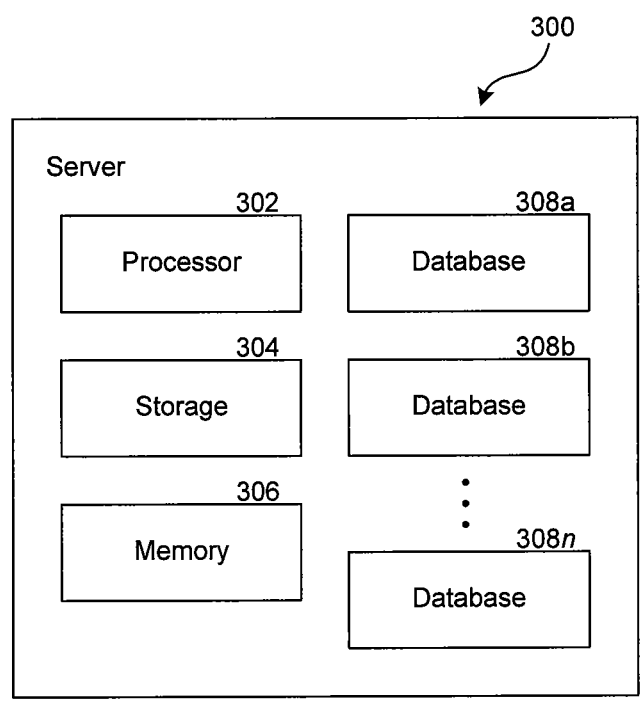
FIG. 3 is a block diagram illustrating components of a server computing device in various embodiments.

FIG. 3 is a block diagram illustrating components of a server computing device in various embodiments. The components of a server 300 can include a processor 302, a storage 304, a memory 306, and one or more databases, such as databases 308A, 308B, and 308N. The processor 302 can be a general purpose or special purpose processor. The databases can store various information that can all be in one database or distributed across several databases, as would be known to one familiar with the art. In various embodiments, the databases can be distributed or replicated across multiple servers. The databases can store images, patches, supplementary information, and other information.

FIG. 4 is a table diagram illustrating an example table 400 for storing various template-related information in various embodiments. The table 400 includes several columns, such as an identifier 402, a location 404, a template 406, supplementary information 408, and additional information 410 columns. The identifier column 402 may uniquely identify a row of the table to enable association with other tables (not illustrated). The location column 404 may identify a location with which the row is associated, such as by indicating location information. The location information may be specified in an encoded manner, such as with GPS coordinates, latitude and longitude, etc. The template column 406 may specify a template, such as by indicating a location from which an image may be retrieved. The supplementary information column 408 can provide supplementary information, and can specify text, provide an image, identify how to render the supplementary information (e.g., visually or audibly), etc. The additional information column 410 may provide additional information relating to the supplementary information, such as where in relation to a center of the matched portion of the image the supplementary information is to be displayed. As an example, if the template matches a portion of a captured image, the supplementary information may be offset from the center of the matched portion of the captured image.

While FIG. 4 illustrates a table whose contents and organization are designed to make them more comprehensible by a human reader, those skilled in the art will appreciate that actual data structures used by the facility to store this information may differ from the table shown, in that they, for example, may be organized in a different manner, may be organized in a non-tabular or non-relational manner, may contain more or less information than illustrated, may be distributed onto multiple servers, may be compressed and/or encrypted, etc.

Figure 5A:
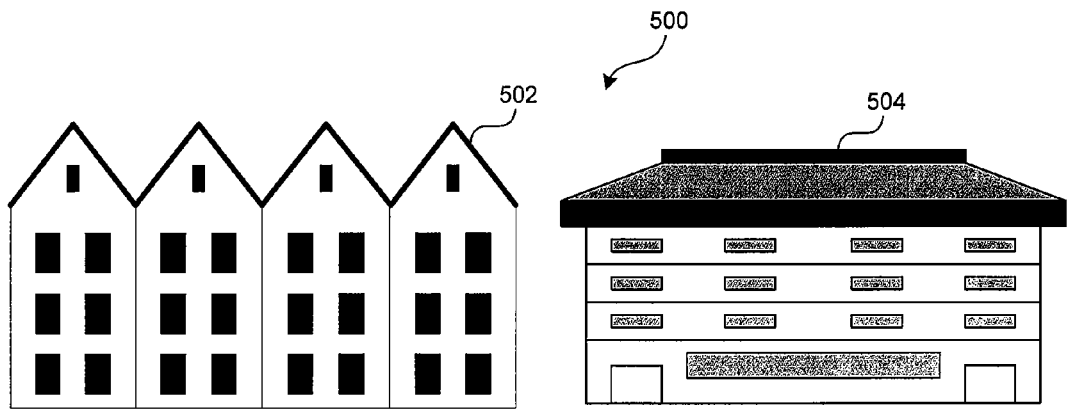
FIG. 5A is an image illustrating an example of a captured image.

FIG. 5A is an image illustrating an example of a captured image 500. The captured image 500 may have been captured by a digital camera of a mobile telephone. The captured image 500 includes two structures: a set of homes 502 and a storefront 504.

Figure 5B:
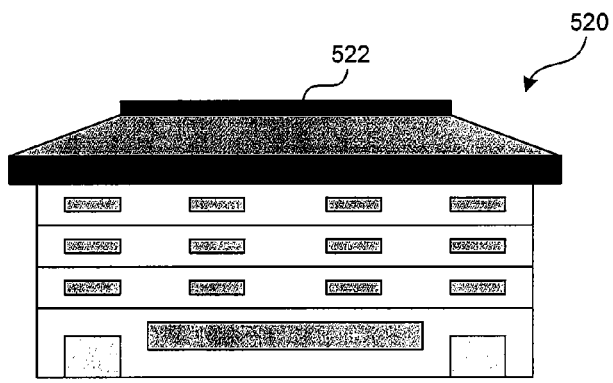
FIG. 5B is an image illustrating an example of a template.

FIG. 5B is an image illustrating an example of a template 520. The template 520 can include a storefront 522, and may be associated with a particular geospatial location. After capturing the image 500, the mobile device may transmit the location at which the image was captured to a server and may receive one or more templates, such as the template 520.

Figure 5C:
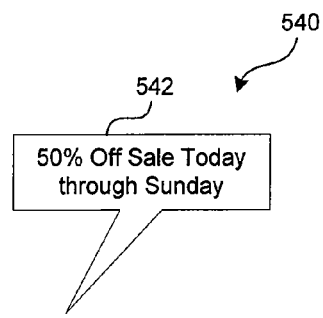
FIG. 5C is an image illustrating an example of supplementary information.

FIG. 5C is an image illustrating an example of supplementary information. The mobile device may also receive supplementary information 540 along with the template 520. The supplementary information 540 may include a text bubble 542 that is associated with the template 520. The mobile device may also receive additional information (not illustrated), such as information indicative of how to display the text bubble 542 if the template 520 matches a portion of the captured image 500.

Figure 5D:
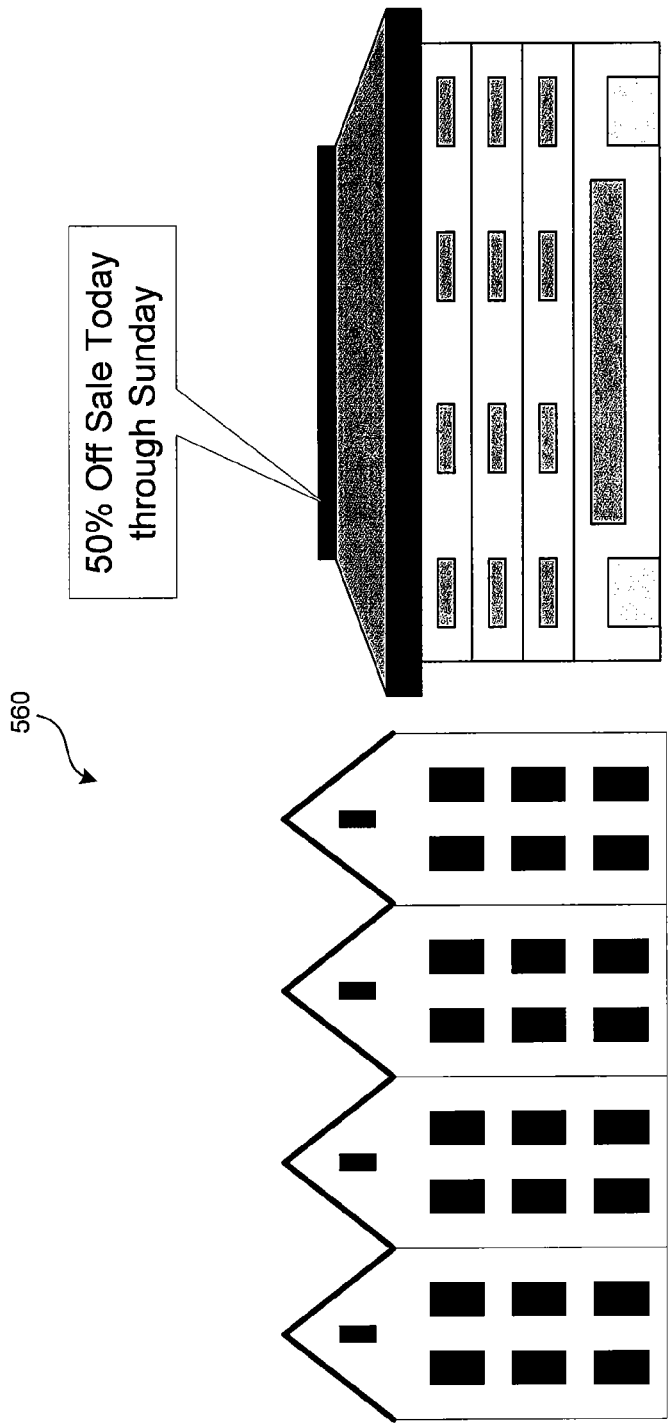
FIG. 5D is an image illustrating an example of superimposition of supplementary information on a captured image.

FIG. 5D is an image illustrating an example of superimposition of supplementary information on a captured image. Upon matching the storefront 522 within template 520 with a similar storefront 504 in captured image 500, an imaging component of the mobile device may superimpose the supplementary information 542 (e.g., as indicated by the received additional information) on the captured image 500 to produce a captured image 560. The imaging component may have identified the match using one or more image matching techniques.

Figure 6:
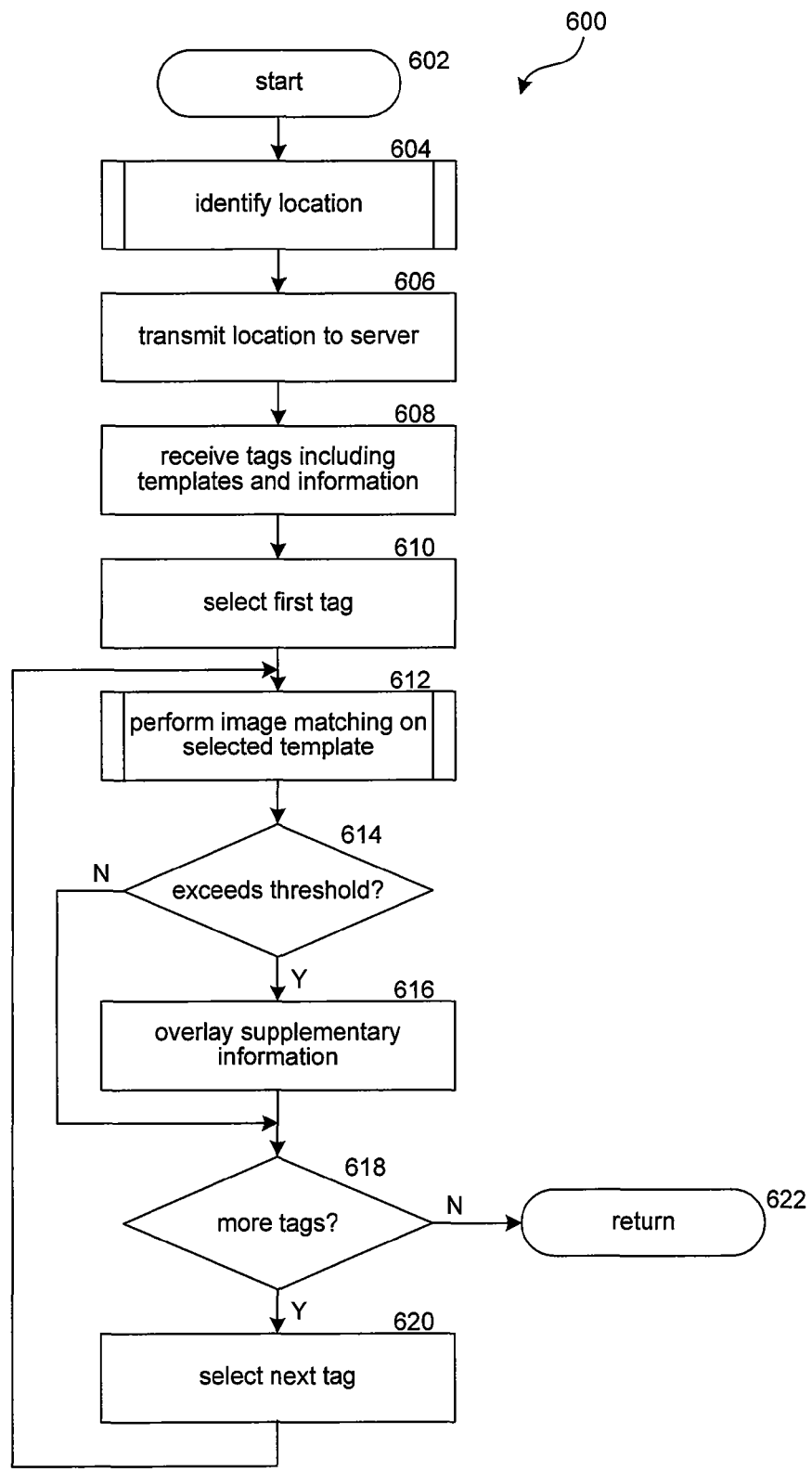
FIG. 6 is a flow diagram illustrating a routine invoked by the image matching technology in some embodiments to match templates in a captured image.

FIG. 6 is a flow diagram illustrating a routine 600 invoked by the image matching technology in some embodiments to match templates in a captured image. The routine 600 may be invoked by a mobile computing device and begins at block 602. At block 604, the routine invokes a subroutine to identify a location, such as when an image is captured. The subroutine to identify locations is described in further detail below in relation to FIG. 7. At block 606, the routine transmits the identified location of the mobile computing device to a server. At block 608, the routine receives one or more tags. A tag is a collection of information including templates and associated information, such as supplementary information and additional information associated with each template. As an example, when a user employs the mobile computing device to capture an image, the mobile computing device may receive multiple tags from a server that stores associations between tags and locations. Each tag can identify one or more templates. At block 610, the routine selects a tag from the received set of tags. At block 612, the routine invokes a subroutine to perform image matching on the template or templates associated with the selected tag. The image matching subroutine is described in further detail below in relation to FIG. 8. At decision block 614, the routine determines whether a confidence indication provided by the subroutine invoked at block 612 exceeds a specified threshold. If the confidence indication exceeds a specified threshold, the routine continues at block 616. Otherwise, the routine continues at decision block 618. At block 616, the routine overlays the supplementary information associated with the selected template or templates on the captured image. If, however, the supplementary information is to be rendered audibly instead of visually, the routine may simply render the audible information, such as via a speaker or earpiece. In various embodiments, the supplementary information may include multiple media forms, such as audio, video, or both. The video can be still images, moving images, or a combination. The routine then continues at decision block 618. At decision block 618, the routine determines whether any tags remain to be processed. If there are additional tags to be processed, the routine continues at block 620. Otherwise, the routine returns at block 622. At block 620, the routine selects another tag for processing. The routine then continues at block 612.

Those skilled in the art will appreciate that the steps shown in FIG. 6 and in each of the flow diagrams discussed below may be altered in a variety of ways. For example, the order of the logic may be rearranged; substeps may be performed in parallel; shown logic may be omitted, or other logic may be included; etc. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
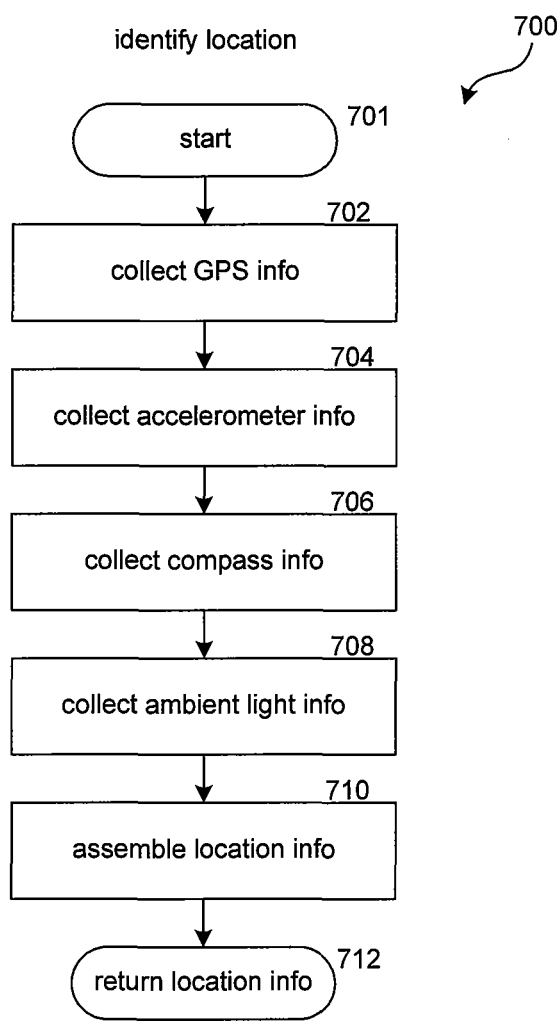
FIG. 7 is a flow diagram illustrating a routine invoked by the image matching technology in some embodiments to identify location information.

FIG. 7 is a flow diagram illustrating a routine 700 invoked by the image matching technology in some embodiments to identify location information. The routine 600 described above in relation to FIG. 6 may invoke the routine 700 to identify a location. The routine 700 begins at block 701. At block 702, the routine collects information from a GPS receiver. The GPS information may indicate the geospatial location at which the image was captured. At block 704, the routine collects information from an accelerometer. The accelerometer may indicate an orientation for the camera, such as vertical, horizontal, upside down, angle, etc. At block 706, the routine collects information from a compass. The compass may indicate in which direction the camera was pointed, such as in relation to a magnetic north. The indicated magnetic north can be compared with other available information (e.g., true north information from the GPS and movement of the camera and magnetic variation at the location) to determine whether the camera is proximate to a metallic object. At block 708, the routine collects information regarding ambient light levels, such as from a light sensor or a camera lens. By collecting ambient light information, the routine may be able to determine whether the camera is indoors or outdoors, weather conditions, etc. At block 710, the routine assembles the collected location information and returns it at block 712.

Figure 8:
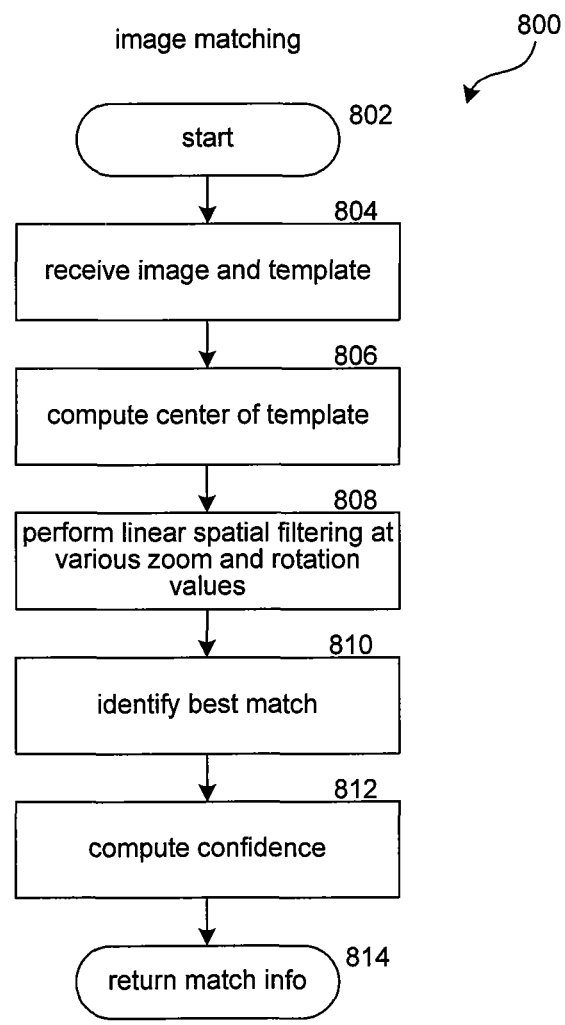
FIG. 8 is a flow diagram illustrating a routine invoked by the image matching technology in some embodiments to match images.

FIG. 8 is a flow diagram illustrating a routine 800 invoked by the image matching technology in some embodiments to match images. The routine 600 described above in relation to FIG. 6 may invoke the routine 800 to match templates with captured images. The routine 800 begins at block 802. At block 804, the routine receives a captured image and a template. At block 806, the routine computes a center of the template. At block 808 the routine performs a linear spatial filtering at various levels of zoom and rotation of the template. As an example, the routine may rotate the template at various angles of rotation from zero degrees to 360 degrees, may enlarge or shrink the template, and then compare the template at each point of the image. Various other image matching techniques known in the art can be employed. In some embodiments, the described technology may employ several image matching techniques to improve matching capability. At block 810, the routine identifies a best match from all the various zooms and rotations for the template. At block 812, the routine computes a confidence for the match. As an example, the routine may determine a percentage of the pixels of the captured image that correspond to pixels of the template. Alternatively, or in combination with a percentage of pixels, the routine may compute a correlation coefficient between the template and a portion or the entirety of the image. At block 814, the routine returns information including the position of the identified that match and the confidence.

Figure 9:
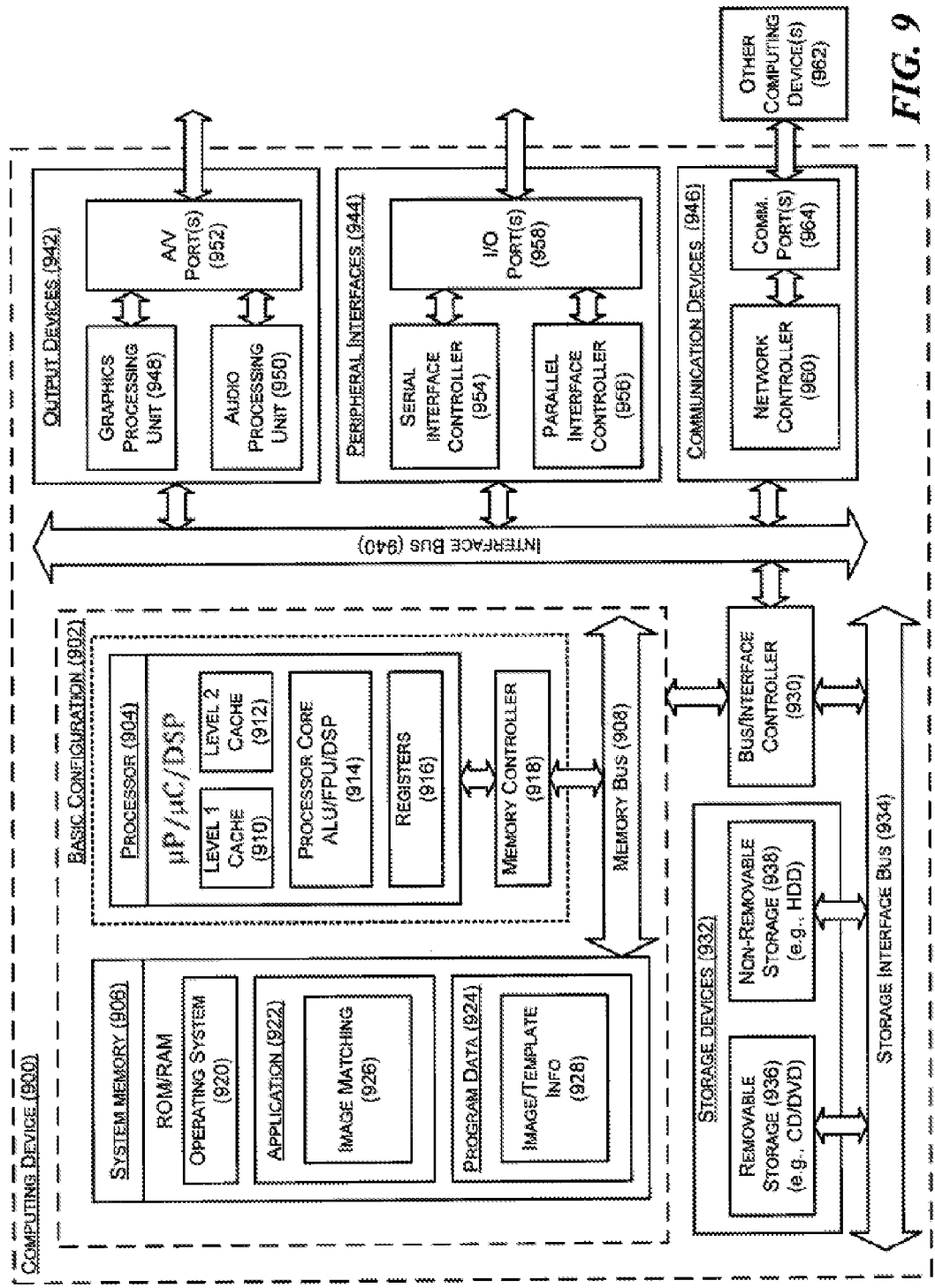
FIG. 9 is a block diagram illustrating an example of a computing device that can be arranged as a mobile computing device (e.g., client or user computing device), server computing device, etc., in accordance with the present disclosure.

FIG. 9 is a block diagram illustrating an example of a computing device that can be arranged as a mobile computing device (e.g., client or user computing device), server computing device, etc., in accordance with the present disclosure. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor ($\mu$P), a microcontroller ($\mu$C), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include one or more image matching components 926 that are arranged to match templates to captured images and perform other image manipulation techniques. The components 926 may employ hardware devices, such as video compression processors (e.g., MPEG encoders or decoders, special purpose processors, media processors, graphics processors, etc.) that implement a video compression specification (e.g., MPEG) or other graphical processors to assist in image processing. Program data 924 may include image/template information (e.g., captured images, templates, supplementary information, etc.) 928 that may be useful for augmenting reality by superimposing images or audible information, as described above. In some embodiments, application 922 may be arranged to operate with program data 924 on operating system 920. This described basic configuration 902 is illustrated in FIG. 9 by those components within the inner dashed line.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

In various embodiments, image matching is performed by software executing at the server. As an example, a mobile phone may send an image and location information to the server. The server may then determine which patches match portions of the image and transmit relevant information to the mobile phone.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or other specific examples embodiments disclosed herein. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that a computing device can use multiple processors or multiple "processor cores" (sometimes referred to as "multicore processors"). In various embodiments, the various computations described herein can be distributed between and among multiple processor cores or by placing the entire computing load on one of the processor cores.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a range having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method performed by a computing system for augmenting reality, comprising:
receiving a captured image;
determining location information relating to the received captured image;
transmitting the determined location information to a server computing device;
receiving one or more tags from the server computing device, each tag including one or more patches and supplementary information corresponding to at least one of the patches, each patch including a patch image and location information that specifies a location that is near a location specified by the determined location information;
determining, using a template matching process, whether at least one of the received one or more patch images appears in the received captured image; and
in response to a determination that a first patch image appears in the received image, rendering the supplementary information corresponding to the patch associated with the first patch image.

2. The method of claim 1, wherein the captured image is received from a digital camera associated with the computing system.

3. The method of claim 1, wherein the determining the location information is based on information received from a GPS signal.

4. The method of claim 1, wherein the location information transforms a physical condition sensed by an accelerometer into an electrical signal.

5. The method of claim 1, wherein the supplementary information is associated with additional information that specifies how to render the supplementary information.

6. The method of claim 1, wherein the template matching process is at least partially performed by a hardware-based video compression processor.

7. The method of claim 1, wherein the rendering includes superimposing an image specified by the supplementary information.

8. The method of claim 1, wherein the rendering includes playing an audible sound specified by the supplementary information.

9. The method of claim 1, further comprising:
identifying a confidence level for the patch image, and
discarding the patch image in response to the patch image having an identified confidence level below a specified threshold confidence level.

10. A computer-readable memory storing computer-executable instructions that, when executed, perform a method for augmenting reality, the method comprising:
receiving a captured digital image that is digitized by an image capturing device;
determining location information for the image capturing device at the time the captured digital image is digitized;
transmitting the determined location information;
receiving one or more tags, each tag including one or more patches, each patch including a patch image and location information that specifies a location that is near a location specified by the determined location information;
determining using a template matching process whether at least one of the tags includes a patch image that appears in the captured digital image; and
in response to a determination that a first patch image appears in the captured digital image, rendering supplementary information corresponding to the patch associated with the first patch image.

11. The computer-readable memory of claim 10, further comprising storing the captured digital image, the first patch image, and the supplementary information in a data structure, wherein the supplementary information specifies information for the rendering in response to the determination that the first patch image appears in the captured digital image.

12. The computer-readable memory of claim 11, wherein the supplementary information includes an image to superimpose on the digital image.

13. The computer-readable memory of claim 11, wherein the supplementary information includes an audible sound.

14. The computer-readable memory of claim 10, wherein at least one of the one or more tags comprises the supplementary information.

15. The computer-readable memory of claim 14, wherein the supplementary information includes additional information specifying rendering information.

16. The computer-readable memory of claim 10, wherein the determined location information is transmitted using a wireless data communications protocol supported by a mobile telephone service.

17. A system for augmenting reality, comprising:
a processor and memory;
an image capturing component;
a hardware component configured to detect position information in response to an image being captured by the image capturing component;
a transceiver configured to transmit the detected position information and to receive at least one tag, wherein a tag comprises a template image, location information that specifies a location that is near a location specified by the detected location information, and associated information; and
an imaging component configured to employ a template matching routine to determine whether the template image appears within the captured image and to render supplementary information responsive to a determination that the template image appears within the captured image.

18. The system of claim 17, wherein the image capturing component includes a digital camera associated with a client computing device with which the processor and memory are associated.

19. The system of claim 17, wherein the hardware component includes at least one of a GPS receiver, an accelerometer, or a compass.

20. The system of claim 17, wherein the imaging component is further configured to function in association with a second hardware component configured to implement video compression specification.

21. The system of claim 17, wherein the supplementary information is rendered by superimposition of an image on the captured image.

* * * * *

UNITED STATES PATENT AND TRADEMARK OFFICE
CERTIFICATE OF CORRECTION

| | | |
|---|---|---|
| PATENT NO. | : 9,001,252 B2 | Page 1 of 1 |
| APPLICATION NO. | : 12/611083 | |
| DATED | : April 7, 2015 | |
| INVENTOR(S) | : Hannaford | |

It is certified that error appears in the above-identified patent and that said Letters Patent is hereby corrected as shown below:

In the specification

In Column 10, Line 11, delete "embodiments" and insert -- or embodiments --, therefor.

In Column 11, Line 28, delete "digital signal processors," and insert -- and digital signal processors, --, therefor.

Signed and Sealed this
Seventeenth Day of November, 2015

Michelle K. Lee
*Director of the United States Patent and Trademark Office*